Oct. 8, 1935.　　　J. W. BRYCE　　　2,016,704
ACCOUNTING MACHINE
Filed Dec. 23, 1931　　　4 Sheets-Sheet 1

Oct. 8, 1935.  J. W. BRYCE  2,016,704
ACCOUNTING MACHINE
Filed Dec. 23, 1931  4 Sheets-Sheet 2

INVENTOR-
James W. Bryce
BY
ATTORNEY-

Oct. 8, 1935.  J. W. BRYCE  2,016,704
ACCOUNTING MACHINE
Filed Dec. 23, 1931  4 Sheets-Sheet 3

Patented Oct. 8, 1935

2,016,704

UNITED STATES PATENT OFFICE 2,016,704

ACCOUNTING MACHINE

James W. Bryce, Bloomfield, N. J., assignor, by mesne assignments, to International Business Machines Corporation, New York, N. Y., a corporation of New York Application December 23, 1931, Serial No. 582,675

9 Claims. (Cl. 235—92)

This invention relates to tabulating machines of the type wherein data are taken from perforated cards to control accumulating and printing operations of the machine.

The main object of the invention is to improve generally upon machines of this character; as for instance by so constructing and arranging the parts and the mode of operation as to obtain greater operating speed and a higher degree of reliability than is at present possible.

It is a desideratum in certain types of work performed by tabulating machines wherein a list of items is printed under record card control and a total of the items printed as an accompaniment to the itemized list, to obtain a total which is truly representative of the sum of the printed items. In former machines it has not been possible to determine by inspection whether or not the printed total represented the true sum of the listed items, since, because of the manner of organization of the machine there has been a likelihood that an amount taken from a record card for concurrent entry into a totalizer and for printing may be correctly entered into the totalizer but may be erroneously printed upon the record sheet. The resulting list therefore might show a total truly representative of the sum of the items taken from the record cards but the itemized list may be incorrect in several of its items. This is an undesirable condition, especially where the items and their total represent monetary values. Take for example, the problem of preparing a payroll list for a department, the total amount of whose payroll is a known quantity. Each check or envelope to be prepared may be individually listed and the total printed together therewith. The fact that the printed total as calculated by the machine corresponds to the known total of the department, is not a positive indication that the items have been printed correctly, so that in preparing pay envelopes and checks in accordance with the printed list there is possibility that incorrect payments will be made in certain cases.

It is the object of the present invention therefore to so re-organize the interrelation between the accumulating and printing devices of the tabulating machine, that where a printed list is accompanied by a printed total the agreement of such total with a known figure will be a certain indication that the items as listed are correct. Where an incorrectness occurs in any printed item, the tendency of the machine will be to effect the total in the same degree in which case the non-agreement of the total with the expected figure will indicate that an error is present. This result has been achieved by providing a simplified type of printing mechanism having a constantly rotating type drum and a power actuated impression hammer for striking an impression from a type.

A more specific object resides in the provision of devices for causing the hammer actuating mechanism to effect the operation of the accumulating device, the accumulator actuation being so timed that the type hammer will have been selected and be traveling toward printing position to print a particular character at the time that the accumulator is actuated to enter the same value therein. It is thus obvious that the actuation of the accumulator is dependent upon and incidental to the actual printing operation which, once initiated, is certain to print the character selected. If, due to any cause, the character selected for the printing is not the desired one, the value entered into the accumulator will be correspondingly undesirable so that there is a certitude that a total printed under such conditions will be truly representative of the printed list of items which it ordinarily follows.

Other objects reside in new and improved structures and cooperations of the several elements of the mechanism as will be pointed out in the following detailed description.

The invention is illustrated by way of example in the drawings in which.

Figure 4:
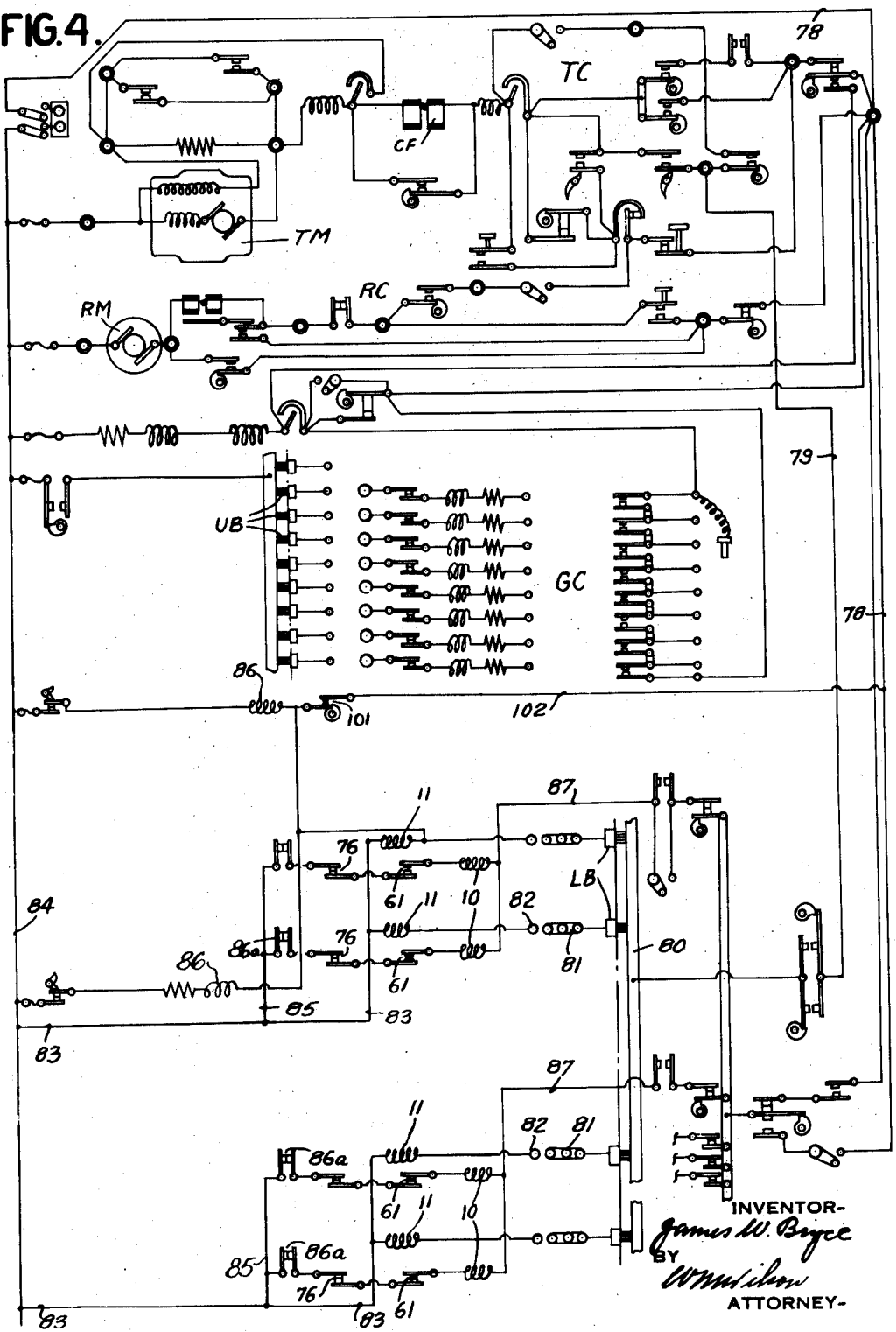
Fig. 4 shows a wiring diagram of the electric circuits of the tabulating machine to which the printing device may be applied.

The controlling circuits of the wiring diagram shown in Fig. 4 are substantially those of the printing tabulator disclosed in the patent to Daly and Page No. 1,762,145, issued June 10, 1930. During adding operations, the machine is driven by a tabulating motor TM which is controlled by a group of circuits including relays and cam contacts and indicated generally at TC. The usual card feed clutch magnet is shown at CF in series with the tabulating motor and is effective to feed the usual perforated cards as long as the tabulating motor TM is in operation.

The cards feed successively past the upper analyzing brushes UB (Fig. 4) and the lower analyzing brushes LB and as they pass the latter the items represented by the perforations may be entered into accumulators represented by counter magnets 10 and printed by printer magnets 11. The cards continue to feed and the successive items continue to be entered as long as certain classification perforations on successive cards do not change, this being taken care of by the usual group control system indicated generally at GC. On a change in the group classification perforations, the group control system interrupts accumulating and a total taking operation may be initiated, the machine in this instance being driven by the reset motor RM under control of a group of circuits indicated generally at RC.

Each card column contains ten index point positions differentially located to represent the ten digits and a different digit is represented by a perforation in each position. As the card passes the lower brushes LB the position of its index points determines the time of closure of circuits through the analyzing brushes and the resulting current impulses may energize selected printer magnets 11 when the latter are properly plugged to the lower analyzing brushes LB.

A shaft 20 (Fig. 1) is suitably geared to the main drive shaft of the tabulator so as to rotate constantly therewith and make one revolution for each cycle of operation of the tabulator. Driven from shaft 20 through gearing designated generally at 21 is a shaft 22 which has secured thereto a printing drum 23. Disposed on opposite sides of the drum 23 is a set of duplicate printing type 24 which rotate with the drum and a set of such duplicate type is provided for each column of the record which is to be printed. Each set includes two groups of ten type elements each and each group comprises type elements corresponding to the ten digits 0-9. A stationary circular shield or casing 25 fixedly secured to the frame of the device is disposed about the printing drum and is provided with an opening 26 through which printing is effected upon a record strip 27. The strip 27 is fed from a supply reel 28 and around shield 25 to a pair of feed rollers 29 and 30. The former is adapted to be rotated slightly in a counterclockwise direction to effect line spacing by means of a pawl mechanism generally designated 31 cooperating with ratchet 32 rigidly secured to the shaft of roller 29. The ratchet actuating mechanism 31 is adapted to be operated by a cam 33 secured to shaft 22. Mechanism 31 is pivoted at 31a (Fig. 1) and has a roller 31b which cooperates with cam 33 in such manner that the mechanism is rocked slightly in a clockwise direction to advance roller 29.

The usual printing ribbon 34 is suitably guided between record strip 27 and type elements 24 and may be suitably advanced by mechanism not shown in detail. A printing hammer 35, one of which is provided for each column, is adapted to be positively impelled toward the printing drum 23 during the movement of the type past printing position. This action takes place under control of the printing magnet 11 in the following manner:

Secured upon constantly rotating shaft 20 is a toothed actuating member 36 having teeth 37 adapted to cooperate with a tooth 38 in an arm 39 which is pivoted to the lower extremity of a lever 40 pivoted at 41. Carried by arm 39 is a stud 42 adapted to be engaged by a spring-pressed member 43 carried on lever 44.

Energization of magnet 11 through its armature 45 and link 46 will rock spring-pressed latch 47 in a clockwise direction releasing lever 44 for movement in a counterclockwise direction under the influence of its spring 48. The consequent depression of member 43 and its engagement with stud 42 will move the tooth 38 into engagement with a tooth 37 of actuating member 36 whereupon the member 39 will be moved in a positive manner toward the right, rocking lever 40 about its pivot 41. The upper extremity of lever 40 is adapted to engage a depending arm of hammer 35 and rock the hammer in a clockwise direction about its pivot 50. As arm 39 is moved toward the right the free end thereof is adapted to engage the inclined camming surface 51 which serves to disengage tooth 38 from the actuating member 36. This disengagement will take place when the parts are substantially in the position shown in Fig. 3 at which time the lever 40 will have positively rocked the printing hammer 35 so that its striking point is just about to make contact with the record strip. The momentum of the hammer will carry it forward from this point to make actual printing contact between the record strip and a type element 24 after which it will rebound to home position where it is restrained by its spring 52.

The gearing is such that the type elements 24 pass printing position in synchronism with the passage of the index point positions of the record card past the analyzing brushes of the tabulating machine and the teeth 37 in the actuator 36 are so arranged that a tooth will pass the tooth 38 during the passage of a type 24 past the printing line. When all of the type 24 in either set have passed printing position a cam 53 mounted on shaft 20 is adapted through spring-pressed linkage 54 to rock the shaft 55 to cause depression of restoring fingers 56 mounted on shaft 55.

Counterclockwise rocking of finger 56 will restore lever 44 to its normal position and through extension 49 will also cause positive restoration of latch 47 and its connected link 46 and armature 45. Upon release of arm 39 from actuator 36 the arm is held upwardly and moved toward the left together with lever 40 by spring 57. Member 43 is so constructed as to offer no resistance to the restoration of arm 39 if the lever 44 has not been relatched. Now when lever 44 is rocked clockwise and relatched, the member 43 will snap back over stud 42 to the position of Fig. 1.

Figure 3:
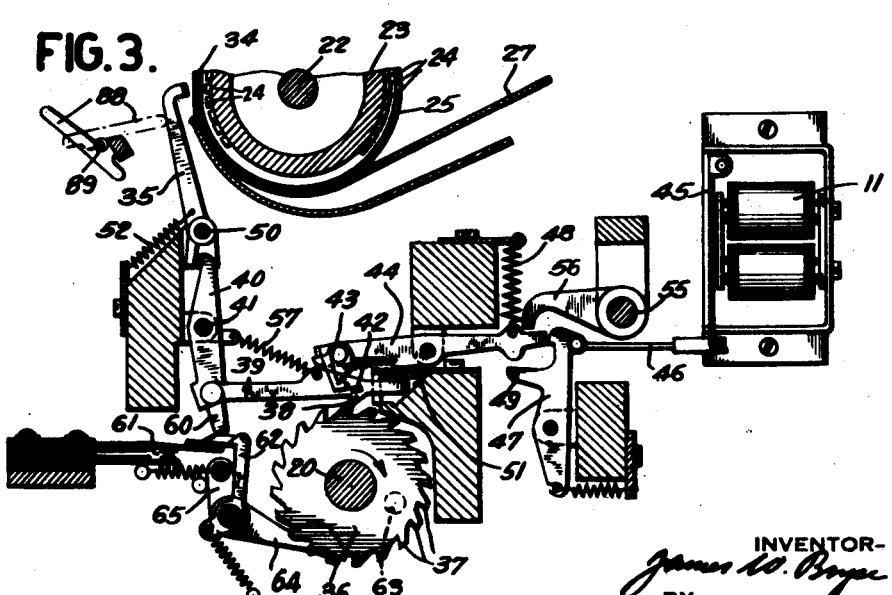
Fig. 3 is a view of parts shown in Fig. 1 shown in another position.

Lever 40 is provided with a depending extension 60 which cooperates with the upper blade of a pair of contacts 61. Rocking of lever 40 in a counterclockwise direction to actuate its printing hammer 35 will cause closure of contact 61 as shown in Fig. 3. In such position the spring-pressed latch 62 will engage the free end of the upper blade of the contact holding the same in closed position. In this manner the several levers 40 will close their associated contacts 61 at times in the cycle of operation of the machine dependent upon the value of the character selected for printing. After all the type have passed printing position a pin 63 carried by actuating member 36 is adapted to strike an arm 64 of a bail 65 rocking the latter in a clockwise direction which will result in the release of contacts 61 so they may return to their restored or open position due to the resiliency of the contact blades.

Figure 2:
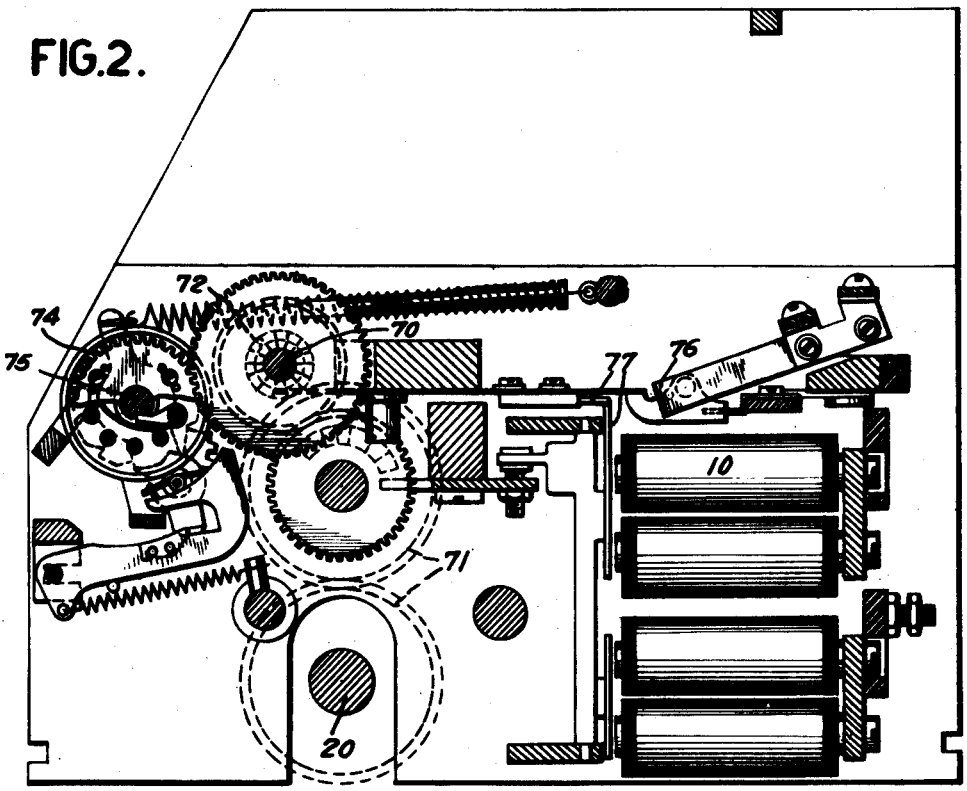
Fig. 2 is a cross sectional view of the accumulating mechanism.

The closing of contacts 61 causes the magnets 10 which control the accumulator elements to be energized. The accumulator shown in Fig. 2 is the well-known Hollerith type of accumulator shown and described in Patents No. 1,822,594, issued September 8, 1931, and No. 1,307,740, issued June 24, 1919, and operates in the following manner: The shaft 70 is a constantly rotating shaft and is driven from the shaft 20 through gearing generally designated 71 so that it also operates in synchronism with the passage of the record cards past the analyzing brushes.

Attached to shaft 70 and rotating therewith are clutch elements 72 which are shiftable along the shaft to engage the other faces of the clutches. These elements of the clutches have attached thereto gears 73 which are in mesh with the gears on the numeral or index wheels 74 free on the shaft 75. The clutch element 72 is urged to engage the other face of the clutch by the spring contacts 76; engagement is prevented by means of the latches 77. When magnet 10 is energized the latch 77 is attracted and the clutch element 72 engages the other face of the clutch causing the rotation of the gear 73 and the numeral wheel 74. The shaft 70 makes one revolution or one cycle for each card passing the analyzing station. The cards are fed so that the nine position is first presented to the analyzing station.

From the above it will be seen that if one of the columns of the card is perforated in the "5" position, the magnet 10 will be energized under control of the printing devices and the adding clutch engaged at a point in the cycle that will rotate the numeral wheel to indicate the value 5. At the end of the cycle the clutches are disengaged by the usual knock-out mechanism.

Referring to Fig. 4, the printing and adding circuits will now be traced. Printing magnets 11 and counter magnets 10 are shown in the lower portion of the figure. As the cards pass the lower analyzing brushes LB current is supplied thereto from the right side of line 78, through the control devices TC, to a wire 79, thence to the common conductor 80 of the lower brushes. From here the circuit through suitable plug wires may extend from the lower brush sockets 81 to any of the sockets 82 which will extend the circuit through printing magnet 11 and a wire 83 to the left side of line 84. Energization of magnet 11 will effect printing of the selected character in the manner explained.

The operation of the hammer selecting lever will cause closure of its associated contact 61 which will thereupon complete the circuit to the associated adding magnet 10 through a circuit extending from the left side of line 84, wire 83, wire 85, relay contact 86a of a relay coil 86, contact 76, contact 61, magnet 10, wire 87 to right side of line 78 through the usual cam contact devices. Energization of magnet 10 will open its related contact 76 to break this circuit. It may be mentioned here that in Fig. 4, relays and their related contacts are distinguished by the application of a reference numeral only to the coil of the relay and the same reference numeral suffixed by a letter, to the related contacts. However, where contacts are closed by a magnet only as an incident to some other function of the magnet, the relationship is not so indicated in the drawings.

Figure 1:
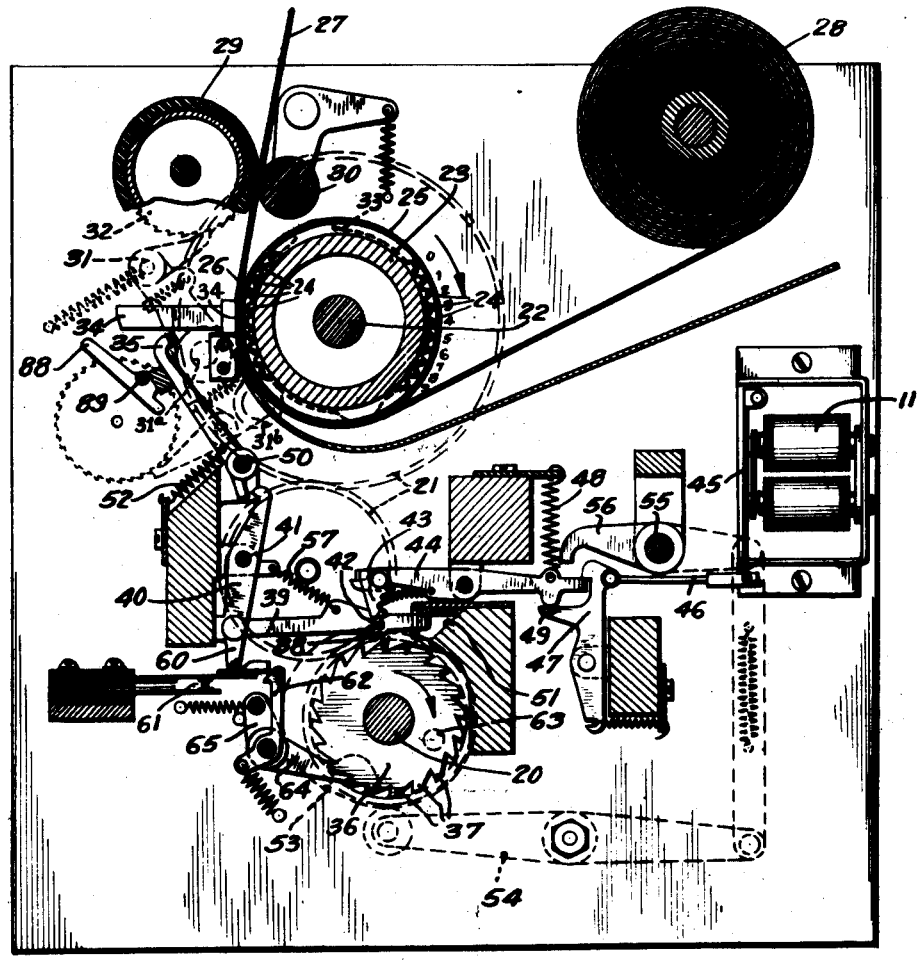
Fig. 1 is a cross sectional view of the printing mechanism.

In columns in which it is desirable to accumulate items without printing the same, a lever 88 pivoted at 89 may be rocked from the position shown in Fig. 1 to its dotted line position of Fig. 3. In this position the type hammer 35 is held just beyond the range of actuating lever 40 so that operation of the lever will cause closure of contact 61 only.

The contacts 86a (Fig. 4) are normally controlled by relays 86 whose energization is controlled from cam contacts 101 operated from the total shaft of the machine. During adding and listing operations contacts 101 are open but during totaling they close to energize the magnets 86 which energization results in the opening of contacts 86a.

Figure 5:
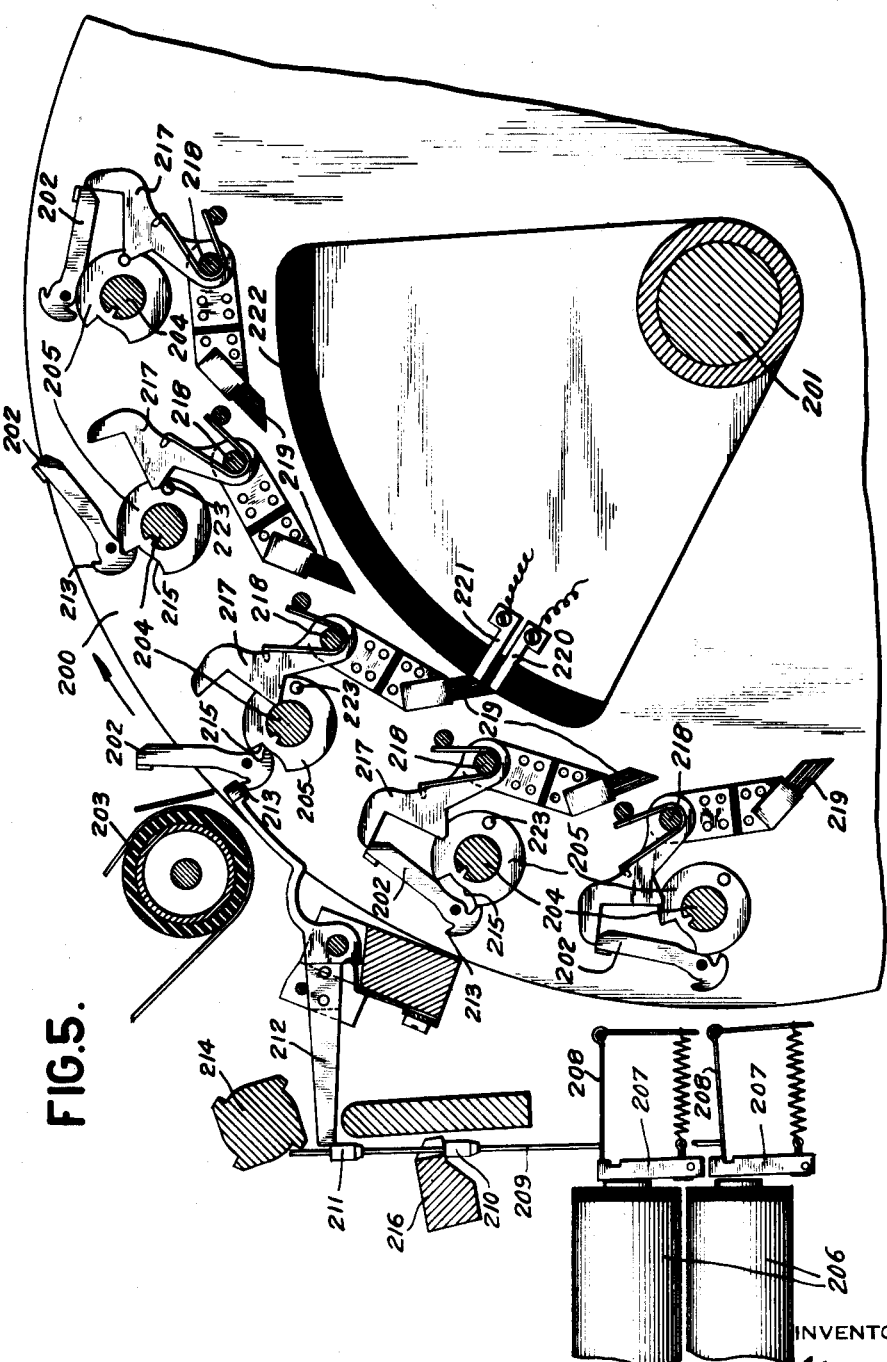
Fig. 5 is a detail of another type of printing mechanism to which the invention is applicable.

In Fig. 5 is shown a modified form of printing mechanism of the type shown and described in Patent No. 1,516,071, issued November 18, 1924 to Fred M. Carroll. A printing drum 200 is driven in unison with the card feeding devices; rotating about a shaft 201, in such manner that the type hammers 202 pass the platen 203 in synchronism with the transit of the corresponding index point positions of the record cards past the analyzing brushes. A plurality of shafts 204 carried by drum 200 are adapted to rotate in a direction opposite to the direction of rotation of drum 200. These shafts are suitably splined to receive controlling cams 205 of which there is one on each shaft 204 for each column of index point positions in the card to be listed. These cams aid in controlling the operation of the type hammers 202 which effect printing. A type hammer 202 is called into action when a perforation in the corresponding index point position of the card passes the controlling brushes LB. At such time a magnet 206 is energized through the same circuits and in the same manner as explained in connection with similar magnets 11.

The energization of magnet 206 is adapted to attract its armature 207 and release a spring latch 208 with which a so-called call wire 209 cooperates. Call wire 209 extends upwardly and at its upper end is provided with two shoulders or abutments 210 and 211. A spring retained hook member 212 is adapted to cooperate with the latter abutment so that when the call wire 209 is elevated by the release of the spring latch 208 the hook member 212 is thrown clockwise into engagement with a hooked end 213 of type hammer 202. This engagement swings the selected type hammer rapidly in a counterclockwise direction and the momentum of the hammer movement is sufficient to impact the type carried by the hammer against the printing ribbon and effect printing upon the paper carried by the platen 203. At the time of this printing action, the hook member 212 is disengaged from the hooked end 213 as clearly shown in Fig. 5. Such disengagement is effected by means of a knock-off cam 214 which is provided with projections cooperating with the ends of the call wires 209, and is driven in unison with drum 200 in a known manner. During the printing operation the cam 205 is turned to position to bring the recess 215 thereof under the tail of the type hammer 202 and thereby permit the free swing of the type hammer. Immediately after the printing operation cam 205 will have turned counterclockwise sufficiently to have contacted against the tail of the type hammer and start it to restore the type hammer 202 clockwise to its normal tangential position where it is locked by the engagement of the arcuate portion thereof with the circular periphery of cam 205. Restoration of call wires 209 is effected by the usual member 216 which cooperates with abutments 210 on the call wires.

The foregoing described the well known manner in which printing is effected in such type of machine. The manner in which accumulating may be controlled thereby will now be explained.

Each hammer 202 has in latching engagement therewith, a member 217 pivoted on a rod 218 and normally spring-pressed against hammer 202. An arm of member 217 carries, insulated therefrom, a brush 219 which cooperates with insert segments 220 and 221 supported by an arcuate member 222 which is arranged within the drum 200 and relatively stationary thereto. Movement of brush 219 into engagement with segments 220, 221 will bridge the circuit between the latter for controlling the operation of the accumulating magnet 10 in the same manner as controlled by the closure of contacts 61 of the preferred form of the invention. Actuation of any hammer 202 will release member 217 permitting it to rock in a counterclockwise direction against rod 204 so that brush 219 will close the circuit 220, 221 concurrently with the printing operation. As cam 205 rotates to lock the hammer a pin 223 carried by the cam will engage member 217 and rock it clockwise as the hammer is being locked in neutral position, following which member 217 will engage the free end of the hammer 202 as shown.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is as follows:

1. A tabulating machine having record analyzing means, printing mechanism and differentially operable means controlled by the analyzing means to control said printing mechanism to effect printing of different characters in accordance with record analysis, entry receiving mechanism having differential devices for operating the same at differential times and means for controlling the differential devices to effect character entry into the entry receiving mechanism and means operated directly by the printing mechanism to concurrently operate said last named control means.

2. In combination, printing mechanism operable in response to differentially timed electrical impulses, operating mechanism therefor adding mechanism also operable in response to differentially timed electrical impulses, and means controlled by said operating mechanism for sending an impulse to control said adding mechanism timed in accordance with the character selected for printing.

3. In a tabulating machine having printing mechanism including a type carrier provided with pivoted type elements movable to and through a printing position, an adding mechanism operable in synchronism with said type carrier, means for moving said type carrier, means for selecting and causing pivoting of a type element for printing operation and means controlled by said element for controlling the operation of said adding mechanism whereby an adding operation will be effected in accordance with the value of the character selected for printing.

4. In an electrical tabulating machine, having a printing mechanism including a plurality of printing elements, each representing a different character, means for differentially operating said type elements, an electric circuit, means controlled by each of said type elements for completing said circuit; differentially timed adding mechanism operable in unison with said type elements and adapted to be controlled by said circuit whereby the value of the character selected for printing will be entered into said adding mechanism.

5. In a tabulating machine having printing mechanism including a rotary type carrier provided with type elements movable to and through a printing position, an accumulator operable in synchronism with said carrier, means for rotating said carrier, a type hammer, means for operating said hammer to take an impression from one of said type during the rotation of the carrier and further means controlled by said hammer operating means for operating said accumulator concurrently with the operation of said hammer whereby an adding operation will be effected in accordance with the value of the character selected for printing.

6. In an accounting machine, a differentially operable printing mechanism, a first control means for controlling the operation of the same, an accumulator and a second control means for controlling the operation of the accumulator, said printing mechanism having provision for operating said second control means at differential times whereby the same effects a corresponding differential operation of said accumulator, only on the performance of a printing operation by said printing mechanism.

7. In an accounting machine, a differentially operable printing mechanism, controlling means therefor, an accumulator, a pair of contacts adapted to be operated at differential times concurrently with said printing mechanism, and means controlled by said contacts for effecting a corresponding differential operation of said accumulator.

8. In a machine of the class described having printing mechanism including a type element, a printing hammer, a power operating means, means for interconnecting said hammer and said power means to cause impelling of said hammer against said type element to take an impression, an entry receiving device and means controlled by said interconnecting means for effecting an operation of said entry receiving device to receive an entry corresponding to the impression made by said hammer.

9. The invention set forth in claim 8 in which settable means is provided for causing said interconnecting means to effect operation of both the hammer and the entry receiving device or of the entry receiving device alone.

JAMES W. BRYCE.